United States Patent
Cash

(10) Patent No.: US 10,282,978 B2
(45) Date of Patent: May 7, 2019

(54) VISIBLE LIGHT PROGRAMMING OF DAYLIGHT SENSORS AND OTHER LIGHTING CONTROL DEVICES

(71) Applicant: ABL IP HOLDING, LLC, Conyers, GA (US)

(72) Inventor: Audwin Cash, Bookhaven, GA (US)

(73) Assignee: ABL IP HOLDING, LLC, Conyers, GA (US)

( * ) Notice: Subject to any disclaimer, the term of this patent is extended or adjusted under 35 U.S.C. 154(b) by 46 days.

(21) Appl. No.: 15/336,278

(22) Filed: Oct. 27, 2016

(65) Prior Publication Data

US 2017/0124861 A1 May 4, 2017

Related U.S. Application Data

(60) Provisional application No. 62/247,667, filed on Oct. 28, 2015.

(51) Int. Cl.
*G08C 23/04* (2006.01)
*G01V 8/10* (2006.01)
(Continued)

(52) U.S. Cl.
CPC ............... *G08C 23/04* (2013.01); *G01J 1/44* (2013.01); *G01V 8/10* (2013.01); *H04B 10/116* (2013.01); *H04L 12/2816* (2013.01); *H04M 1/72533* (2013.01); *H04M 1/737* (2013.01); *G01J 2001/4266* (2013.01); *H04L 67/125* (2013.01); *H04L 2012/284* (2013.01); *H04L 2012/285* (2013.01)

(58) Field of Classification Search
CPC .. G08C 23/04; H04M 1/72527; H04M 1/737; G01J 2001/4266; G01J 1/44; H04B 10/116; H04L 67/125; G01V 8/10
See application file for complete search history.

(56) References Cited

U.S. PATENT DOCUMENTS 7,498,952 B2   3/2009   Newman, Jr.
8,706,271 B2   4/2014   Covaro et al.
(Continued)

FOREIGN PATENT DOCUMENTS

WO   WO 2014/170804   10/2014
WO   WO 2015/022650   2/2015

*Primary Examiner* — Mina M Shalaby
(74) *Attorney, Agent, or Firm* — Dugan & Dugan, PC; Garry J. Tuma

(57) ABSTRACT

A lighting control system includes a daylight sensor configured to receive visible light control signals to set or adjust one or more parameters of the daylight sensor including, e.g., a set point (i.e., an acceptable lighting level). The lighting control system also includes a non-transitory computer program product that includes programming instructions that may be downloaded to, e.g., a mobile device and/or may be executed by a processor or like device. The programming instructions may be configured to provide a user interface related to the daylight sensor, receive via the user interface one or more user inputs related to the daylight sensor, and modulate a light output of a light source to transmit visible light control signals corresponding to the received one or more user inputs. Methods of programming a daylight sensor with visible light control signals are also provided, as are other aspects.

20 Claims, 10 Drawing Sheets

(51) Int. Cl.
*H04B 10/116* (2013.01)
*G01J 1/44* (2006.01)
*H04M 1/737* (2006.01)
*H04M 1/725* (2006.01)
*H04L 12/28* (2006.01)
*H04L 29/08* (2006.01)
*G01J 1/42* (2006.01)

(56) References Cited

U.S. PATENT DOCUMENTS

| | | |
|---|---|---|
| 8,749,146 B2 | 6/2014 | Jones |
| 8,965,218 B2 | 2/2015 | Son et al. |
| 9,585,232 B1 * | 2/2017 | O'Neil ............... H05B 37/0272 |
| 9,661,120 B1 * | 5/2017 | Skeffington ....... H04M 1/72533 |
| 9,674,932 B1 * | 6/2017 | O'Neil ............... H05B 37/0272 |
| 2005/0179404 A1 * | 8/2005 | Veskovic ........... H05B 37/0254 |
| | | 315/291 |
| 2006/0125426 A1 * | 6/2006 | Veskovic ........... H05B 37/0254 |
| | | 315/312 |
| 2006/0202851 A1 * | 9/2006 | Cash .................. H05B 37/0272 |
| | | 340/12.23 |
| 2010/0244706 A1 * | 9/2010 | Steiner ...................... G01J 1/02 |
| | | 315/149 |
| 2012/0095601 A1 * | 4/2012 | Abraham ................. E06B 9/68 |
| | | 700/278 |
| 2013/0016978 A1 * | 1/2013 | Son ...................... H04B 10/116 |
| | | 398/118 |
| 2013/0214609 A1 * | 8/2013 | Carmen, Jr. ........ H05B 37/0227 |
| | | 307/104 |
| 2013/0272223 A1 | 10/2013 | Mathews et al. |
| 2014/0031988 A1 | 1/2014 | Reeder et al. |
| 2015/0063821 A1 | 3/2015 | Mathews et al. |
| 2015/0181662 A1 | 6/2015 | Ghoshal |
| 2016/0353560 A1 * | 12/2016 | Bortolotti ........... F21V 33/0064 |
| 2017/0170906 A1 * | 6/2017 | Holtman .................. G09C 1/00 |
| 2017/0171941 A1 * | 6/2017 | Steiner ............... H05B 37/0254 |
| 2017/0215257 A1 * | 7/2017 | Taipale ............... H05B 37/0263 |
| 2017/0273029 A1 * | 9/2017 | Juang .................. H04W 52/146 |

* cited by examiner

FIG. 3A ON/OFF SWITCHING

FIG. 3B AUTO DIMMING CONTROL

FIG. 3C ON/OFF & DIMMING

| Selection | Display |
|---|---|
| 1 | 0.1 |
| 2 | 0.2 |
| .. | .. |
| 99 | 9.9 |
| 100 | 10 |
| 101 | 11 |
| .. | .. |
| 189 | 99 |
| 190 | 100 |
| 191 | 110 |
| .. | .. |
| 199 | 190 |
| 200 | 200 |

| 1st Byte | 2nd Byte | 3rd Byte | 4th Byte |
|---|---|---|---|
| Header | Data 0 | Data 1 | Error Checking |
| 0xA5 | 0xFF | 0xFF | 0xA5 |

1100

| Sequence | Data 0 | Data 1 | Definition |
|---|---|---|---|
| Curtsy command | 0x00 | 0x00 | Triggers the device to toggle its output to indicate receipt of the command. |
| Automatic Calibration start | 0x00 | 0x01 | Triggers the device to start the Automatic Calibration for the daylight harvesting set-point. |
| Write set-point | 0x01 | 0x-- | Data 1 will hold the index to the set-point selection 0 to 200. |
| Reserved | ... | ... | |
| Lock device | 0xE- | 0x-- | The lower nibble of Data 0, and the entire Data 1 will hold the lock code with values from 0 to 999. |
| Unlock device | 0xF- | 0x-- | The lower nibble of Data 0, and the entire Data 1 will hold the lock code with values from 0 to 999. |

*FIG. 11*

VISIBLE LIGHT PROGRAMMING OF DAYLIGHT SENSORS AND OTHER LIGHTING CONTROL DEVICES

CROSS REFERENCE TO RELATED APPLICATION

This claims the benefit of U.S. Provisional Patent Application No. 62/247,667, filed Oct. 28, 2015, entitled "VISIBLE LIGHT PROGRAMMING OF DAYLIGHT SENSORS AND OTHER LIGHTING CONTROL DEVICES", the disclosure of which is hereby incorporated by reference herein in its entirety for all purposes.

FIELD

The invention relates generally to lighting control systems and, more particularly, to programming a daylight sensor or other lighting control device via visible light control signals.

BACKGROUND

Lighting control systems automate the operation of lighting devices throughout a building or residence based upon preset time schedules and/or occupancy and/or daylight sensing. Lighting control systems may employ, e.g., daylight sensors to reduce artificial lighting, and thus operating costs, when sufficient daylight is available. Daylight sensors may determine which lighting devices to activate or deactivate and/or adjust the dimming light level thereof based on the sensed daylight. Daylight sensors typically compare an amount of sensed daylight with a defined acceptable lighting level. This acceptable lighting level may be called the set point. Some daylight sensors may have an automatic set-point programming mode, wherein the daylight sensor may automatically make light measurements with all lighting devices on at full brightness and all lighting devices off to determine the amount of artificial light the daylight sensor can control. The set point may alternatively be set and/or adjusted (i.e., raised or lowered) by a user to accommodate the user's preferences. Some daylight sensors may be push-button programmable. That is, all modes and light settings may be entered digitally at the daylight sensor via, e.g., a push button sequence or some other physical interaction with the daylight sensor. However, once a daylight sensor is installed, such as, e.g., on a ceiling or wall, it may not be easily accessible. Thus, any initial and/or subsequent programming of the daylight sensor may be difficult. The same or similar difficulties may arise in the initial and/or subsequent programming of other lighting control devices, such as, e.g., occupancy sensors.

Accordingly, a need exists to improve the manner in which installed daylight sensors and/or other lighting control devices can be programmed.

SUMMARY

According to one aspect, a non-transitory computer program product is provided. The non-transitory computer program product comprises programming instructions configured to be executed by a processor. The programming instructions when executed by the processor are configured to cause the processor to (1) provide a user interface related to an optical sensor, (2) receive via the user interface one or more user inputs related to the optical sensor or a lighting control device coupled to the optical sensor, and (3) modulate a light output of a light source to transmit visible light control signals corresponding to the one or more received user inputs. The visible light control signals are configured to set or adjust one or more parameters of the optical sensor or the lighting control device.

According to another aspect, a mobile device is provided. The mobile device comprises a processor, a memory coupled to the processor that comprises programming instructions executable by the processor, a user interface coupled to the processor, and a light source coupled to the processor and having a light output controllable by the processor. The processor is configured via the programming instructions to receive via the user interface one or more user inputs related to a lighting control device, and modulate the light output of the light source to transmit visible light control signals corresponding to the received one or more user inputs, the visible light control signals configured to set or adjust one or more parameters of the lighting control device.

According to yet another aspect, a daylight sensor is provided. The daylight sensor comprises a light receiving device configured to receive ambient light and visible light control signals and to convert the received ambient light and visible light control signals to electrical signals, a microcontroller coupled to receive the electrical signals from the light receiving device, and a memory coupled to or embedded in the microcontroller and comprising programming instructions executable by the microcontroller. The microcontroller is configured via the programming instructions to distinguish the electrical signals converted from the received ambient light from the electrical signals converted from the received visible light control signals, adjust a lighting level of lighting coupled to the daylight sensor in response to receiving the electrical signals converted from the received ambient light; and set or adjust one or more parameters of the daylight sensor in response to receiving the electrical signals converted from the received visible light control signals.

According to a further aspect, a method of programming a daylight sensor is provided. The method comprises receiving one or more inputs related to a daylight sensor via a user interface, modulating a light output of a light source to transmit visible light control signals corresponding to the received user inputs, receiving the visible light control signals at the daylight sensor; and setting or adjusting one or more parameters of the daylight sensor in response to receiving the visible light control signals.

According to a still further aspect, a lighting control system is provided. The lighting control system comprises a daylight sensor and a non-transitory computer program product. The non-transitory computer program product comprises programming instructions configured to be executed on a processor of a mobile device. The programming instructions when executed on the processor are configured to cause the mobile device to provide a user interface related to settings or adjustments of one or more parameters of the daylight sensor, receive via the user interface one or more user inputs related to the settings or adjustments, and modulate a light output of a light source to transmit visible light control signals corresponding to the received one or more user inputs. The daylight sensor comprises a light receiving device configured to receive the visible light control signals and to convert the received visible light control signals to electrical signals. The daylight sensor also comprises a microcontroller coupled to receive the electrical signals from the light receiving device. The microcontroller is configured to set or adjust the one or more parameters of the daylight sensor in response to receiving the electrical signals.

According to yet a further aspect, a daylight sensor is provided. The daylight sensor comprises a light receiving device configured to receive ambient light and visible light control signals and to convert the received ambient light and visible light control signals to electrical signals, the visible light control signals corresponding to settings or adjustments of one or more parameters of a lighting control device coupled to the daylight sensor. The daylight sensor also comprises a microcontroller coupled to receive the electrical signals from the light receiving device, and a memory coupled to or embedded in the microcontroller that comprises programming instructions executable by the microcontroller. The microcontroller is configured via the programming instructions to distinguish the electrical signals converted from the received ambient light from the electrical signals converted from the received visible light control signals, adjust a lighting level of lighting coupled to the daylight sensor in response to receiving the electrical signals converted from the received ambient light; and transmit via a wired or wireless connection to the lighting control device the settings or adjustments in response to receiving the electrical signals converted from the received visible light control signals.

According to another aspect, a lighting control system is provided. The lighting control system comprises an optical sensor and a non-transitory computer program product. The non-transitory computer program product comprises programming instructions configured to be executed on a processor of a mobile device. The programming instructions when executed on the processor are configured to cause the mobile device to provide a user interface related to settings or adjustments of one or more parameters of a lighting control device coupled to the optical sensor, receive via the user interface one or more user inputs related to the settings or adjustments, and modulate a light output of a light source to transmit visible light control signals corresponding to the received one or more user inputs. The optical sensor comprises a light receiving device configured to receive the visible light control signals and to convert the received visible light control signals to electrical signals. The optical sensor also comprises a microcontroller coupled to receive the electrical signals from the light receiving device. The microcontroller is configured to transmit via a wired or wireless connection to the lighting control device the settings or adjustments in response to receiving the electrical signals.

Still other aspects, features, and advantages of the invention may be readily apparent from the following detailed description wherein a number of example embodiments and implementations are described and illustrated, including the best mode contemplated for carrying out the invention. The invention may also include other and different embodiments, and its several details may be modified in various respects, all without departing from the scope of the invention. Accordingly, the drawings and descriptions are to be regarded as illustrative in nature, and not as restrictive. The invention covers all modifications, equivalents, and alternatives of the aspects disclosed herein.

BRIEF DESCRIPTION OF DRAWINGS

Persons skilled in the art will understand that the drawings, described below, are for illustrative purposes only. The drawings are not necessarily drawn to scale and are not intended to limit the scope of this disclosure in any way.

FIG. 11 illustrates a command sequence table according to embodiments.

DETAILED DESCRIPTION

Reference will now be made in detail to the example embodiments of this disclosure, which are illustrated in the accompanying drawings. Wherever possible, the same reference numbers will be used throughout the drawings to refer to the same or like parts.

Lighting control systems may include daylight sensors in accordance with one or more embodiments to provide intelligent control of lighting in defined areas having windows that receive sufficient daylight such that a lighting device can be turned off or at least dimmed. Defined areas may include, e.g., vestibules, corridors, classrooms, and/or offices. Daylight sensors may monitor daylight conditions via, e.g., a photocell and may control one or more lighting devices to ensure that adequate lighting levels ("set points") are maintained. Daylight sensors in accordance with one or more embodiments may have an integrated microcontroller with firmware and may thus not need a separate control unit. In some embodiments, daylight sensors may operate using a single set point with automatic set-point programming that requires only a single installation visit. Calibration may be done at any time of the day. In some embodiments, daylight sensors may automatically adapt to changes in room lighting conditions (e.g., one or more lamps aging or burning out) by modifying the previously determined amount of artificial light the daylight sensor can control. Daylight sensors in accordance with one or more embodiments may communicate over a network and may be daisy-chain wired within a lighting control zone via, e.g., CAT-5 cabling to other devices such as power packs, wall units, and occupancy sensors. Once linked to a gateway, e.g., a daylight sensor in accordance with one or more embodiments may be remotely monitored, upgraded, and controlled via lighting control software that may be downloadable to a mobile device. Embodiments may include low voltage daylight sensors that do not have internal relays and accordingly send their information to relays located elsewhere within a lighting control zone. Embodiments may also include line voltage daylight sensors that have a relay integrated within the daylight sensor that the daylight sensor can control. Daylight sensors in accordance with one or more embodiments may be easily and conveniently programmed via visible light control signals using, e.g., a mobile device executing programming instructions to modulate the light output from a lighting source of the mobile device.

Figure 1:
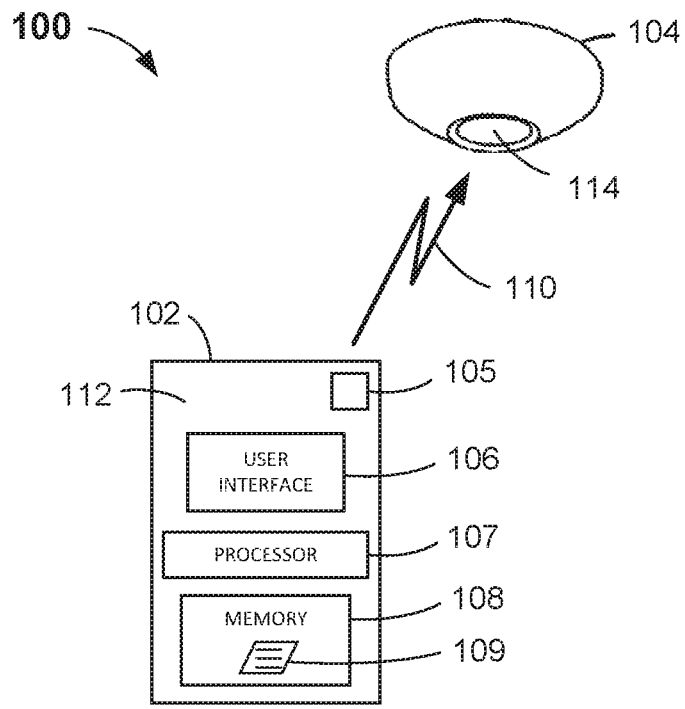
FIG. 1 illustrates a block diagram of a lighting control system according to embodiments.

FIG. 1 shows a lighting control system 100 in accordance with one or more embodiments. Lighting control system 100 may include a mobile device 102, which may be a smartphone or like device, and a daylight sensor 104. Mobile device 102 may include a light source 105, a user interface 106, a processor 107, and a memory 108. Lighting control system 100 may include other components in addition to those shown. Light source 105 may be an LED (light emitting diode) or like device having a light output controllable by processor 107. User interface 106 may include a display (not shown) and one or more actuators (which may be buttons, touch-screen controls, etc.) (not shown) for allowing a user to view information and enter inputs. Processor 107 may be, e.g., a microprocessor, a CPU (central processing unit), a microcontroller, a digital signal processor, or like computer processing device. Memory 108 may include programming instructions 109 that may include a daylight sensor application. Programming instructions 109 may be configured to be executed by processor 107.

Processor 107 may be coupled to light source 105, user interface 106, and memory 108 and may be configured via programming instructions 109 to receive via user interface 106 user inputs related to daylight sensor 104. The user inputs may include, e.g., the set point and/or an SDF (sunlight discount factor). Processor 107 may also be configured via programming instructions 109 to modulate the light output of light source 105 to transmit visible light control signals 110. Visible light control signals 110 may be configured to be received by daylight sensor 104. In some embodiments, a maximum distance between mobile device 102 and daylight sensor 104 for transmitting and receiving visible light control signals 110 may be about 5 feet. Other suitable distances may be possible in other embodiments. In some embodiments, a maximum angle of the location of mobile device 102 relative to a face 114 of daylight sensor 104 may be about 10 degrees. In some embodiments, a maximum angle of a face 112 of mobile device 102 relative to face 114 of daylight sensor 104 may be about 5 degrees.

Daylight sensor 104 may be coupled to one or more lighting units (not shown) and, in particular, may communicate with a dimmable ballast of a lighting unit via, e.g., low voltage Class 2 wiring. In some embodiments, daylight sensor 104 may optionally be coupled to other devices, such as, wall switch units, a communications router, a gateway, a power pack, a host computer, etc., and may be so coupled via a wired or wireless communications network.

Figure 2:
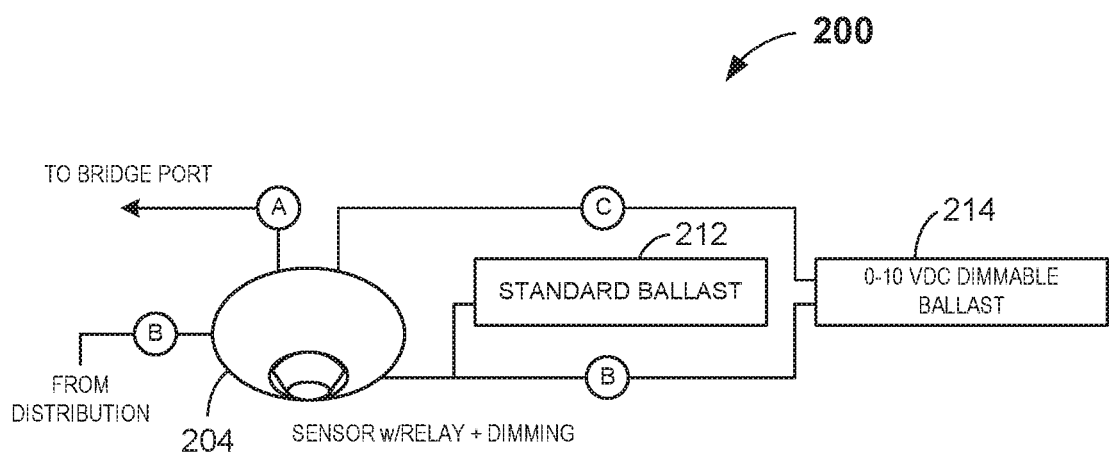
FIG. 2 illustrates a block diagram of another lighting control system according to embodiments.

FIG. 2 shows another lighting control system in accordance with one or more embodiments. Lighting control system 200 may include a daylight sensor 204, which in some embodiments may be identical to daylight sensor 104. Daylight sensor 204 may be connected to a bridge/communications router (not shown) via CAT-5 cabling A and to a load 214 via low voltage Class 2 wiring C. Load 214 may have a dimmable ballast. Line voltage may be connected to daylight sensor 204 via Class 1 wiring B. Daylight sensor 204 may include an integrated relay, which may connect to loads 212 and 214 also via Class 1 wiring B. Daylight sensor 204 may control the on/off operation of load 212, which may be a lighting device driven by a standard ballast, and may control the on/off operation and a dimming level of load 214, which may be a lighting device driven by a 0-10 VDC dimmable ballast. Lighting control system 200 may include components other than those shown.

Figure 3:
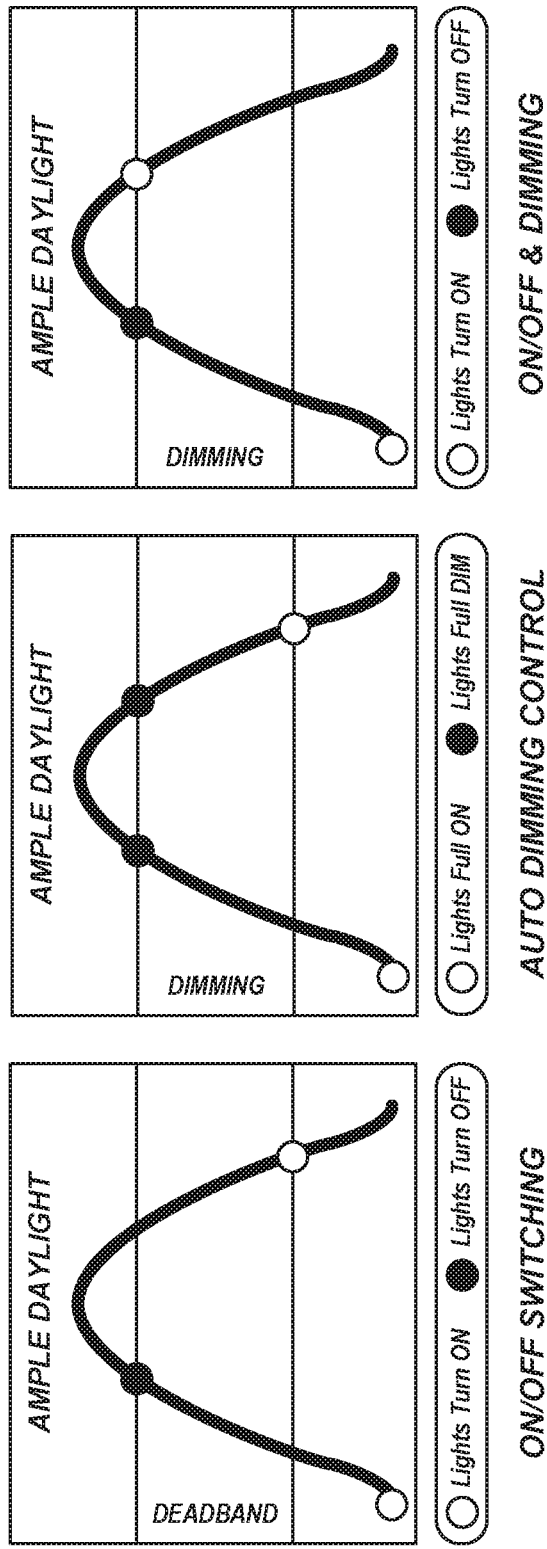
FIGS. 3A-C illustrate various daylight sensing modes according to embodiments.

In some embodiments, daylight sensors 104 and/or 204 may provide on/off functionality, dimming functionality, or both, as illustrated in FIGS. 3A-C. To provide on/off functionality, daylight sensors 104 and/or 204 may control relays to connect/disconnect line voltage to one or more lighting devices. To provide dimming functionality, daylight sensors 104 and/or 204 may control, e.g., 0-10 VDC dimmable ballasts of lighting devices by issuing dimming commands to the ballasts over low voltage wiring. Daylight sensors 104 and/or 204 may be a 2-pole device (but alternatively may be single pole) that has a second output to separately control an additional load or a second group of lighting devices in a lighting control zone. The set point for the second output may be a percentage of the first pole's set point. Also, a second 0-10 VDC dimmable ballast may be controlled by the second output at a selected daylight level higher than that used for a first 0-10 VDC dimmable ballast controlled by the first output. Daylight sensors 104 and/or 204 may determine the necessary on/off combination of the two poles in order to maintain adequate lighting.

Figure 4:
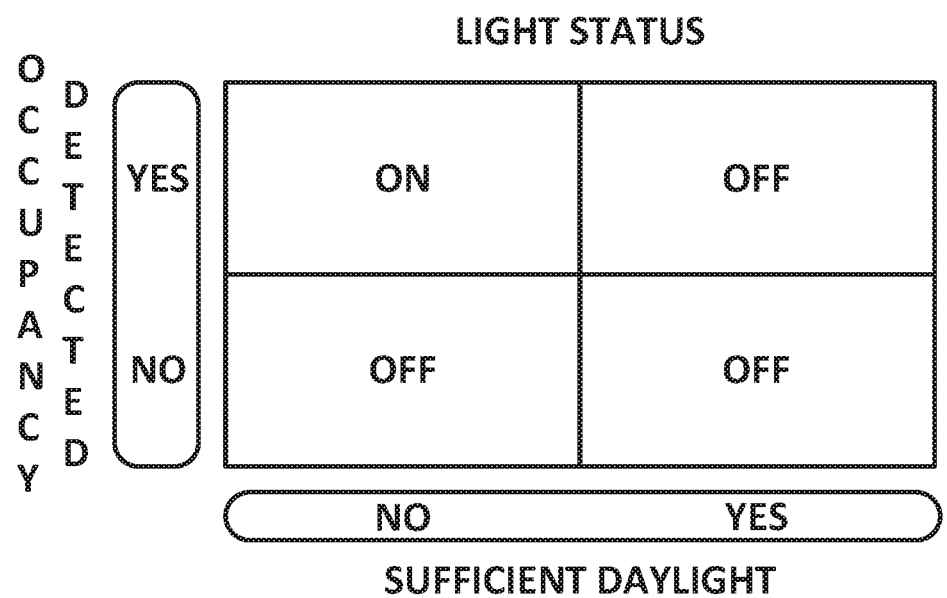
FIG. 4 illustrates joint control of a lighting device by an occupancy sensor and a daylight sensor according to embodiments.

Daylight sensors 104 and/or 204 may be used with occupancy sensors to achieve even greater energy savings. In some embodiments, lighting control decisions may be made using occupancy as the primary factor and daylight as the secondary factor, as shown in FIG. 4. For example, if no occupancy is detected, lights are OFF regardless of whether or not sufficient daylight is available.

Figure 5:
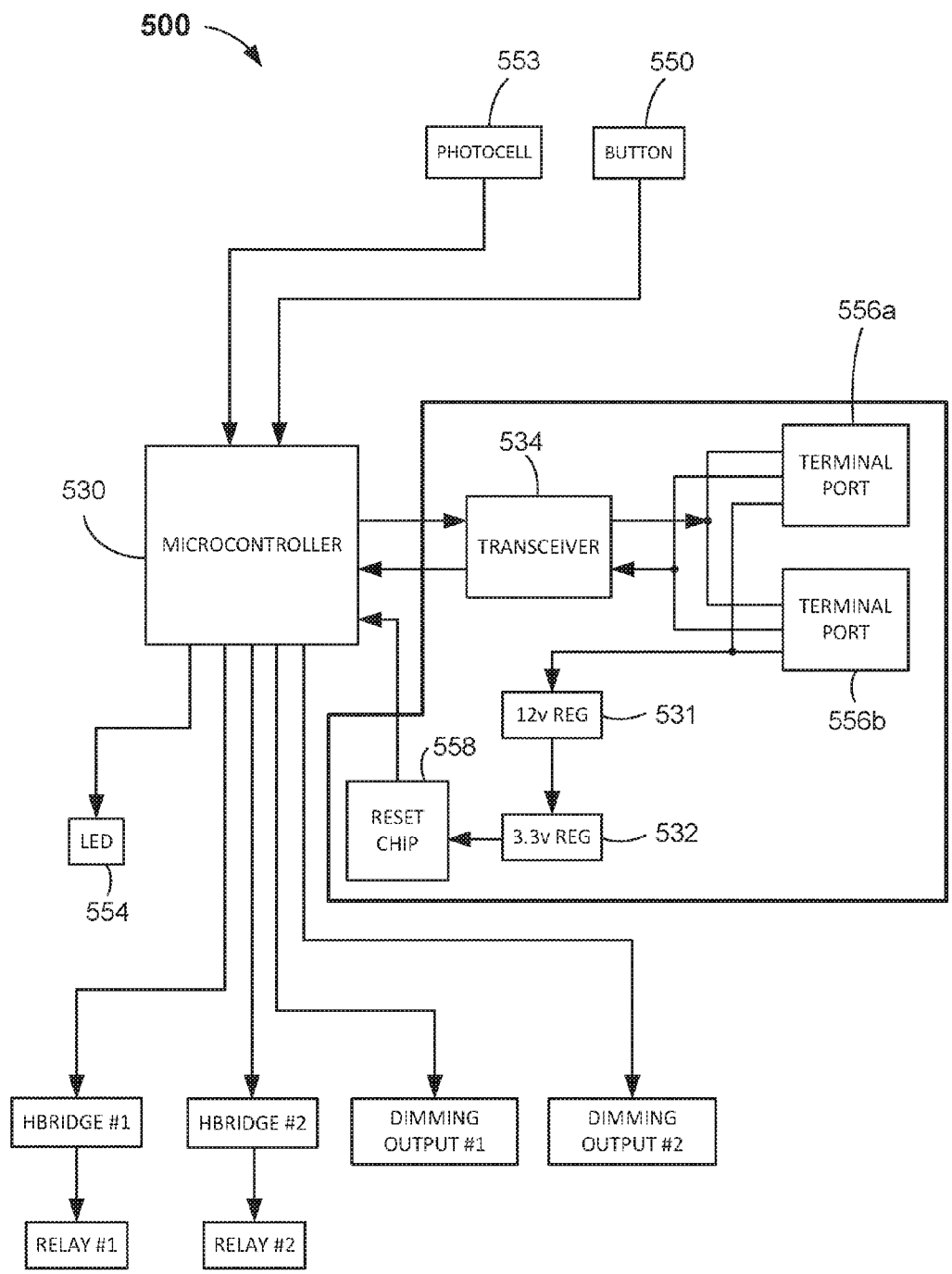
FIG. 5 illustrates a block diagram of a daylight sensor according to embodiments.

FIG. 5 shows a basic hardware configuration 500 of daylight sensors 104 and/or 204 in accordance with one or more embodiments. Daylight sensor configuration 500 may include a microcontroller 530, voltage regulators 531 and 532, a transceiver 534, a push button 550, a light receiving element 553 (e.g., a photocell or photodiode) 553, an LED 554, connector ports 556a and 556b, a reset chip 558, H-bridges #1 and #2, relays #1 and #2, and dimming outputs #1 and #2. Reset chip 558 may monitor the voltage from regulator 532 and may disable microcontroller 530 via a reset pin if the voltage falls below a set level, which may be, e.g., 2.8 volts in a 3.3 volt system. This may prevent the microcontroller from possibly malfunctioning or locking up should its input voltage drop below a certain level. The H-bridges may provide the sensors with reversible relay logic. That is, the H-bridges are circuits that may allow current to pass in either direction (i.e., either polarity) through the relay coil to allow the relay to be thrown in either direction. Microcontroller 530 may be, e.g., a Texas Instruments MSP430F2272; transceiver 534 may be an RS-485 Analog Devices ADM3493; and reset chip 558 may be a TelCom Semiconductor TC54VN27 voltage detector. Note that the various embodiments of the daylight sensors described herein may have alternative, additional, or fewer components than those shown in FIG. 5. For example, some daylight sensors may have no relays or only one relay. Other sensors may have no dimming output or only one dimming output.

In some embodiments, visible light control signals 110 transmitted to and received by daylight sensors 104 and/or 204 may include one or more settings and/or adjustments of one or more parameters of other lighting control devices coupled to daylight sensors 104 and/or 204. Daylight sensors 104 and/or 204 may therefore electrically communicate those received one or more settings and/or adjustments via one or more wired or wireless connections to one or more other devices, such as, e.g., one or more occupancy sensors, other daylight sensors, etc.

Figure 6:
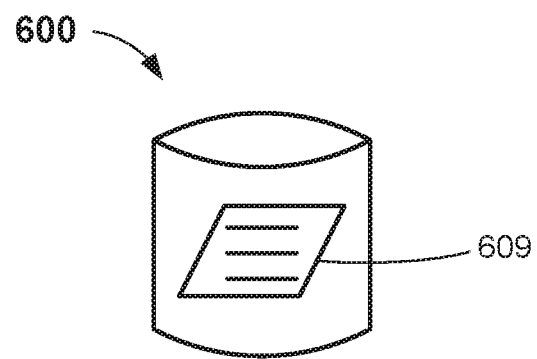
FIG. 6 illustrates a non-transitory computer program product according to embodiments.

FIG. 6 shows a non-transitory computer program product 600 that includes programming instructions 609 in accordance with one or more embodiments. Non-transitory computer program product 600 may be any suitable non-transitory media readable by a computer device. Computer program product 600 may include volatile and non-volatile media and may be, e.g., a floppy disc, a compact disc, a DVD, a hard drive, a read-only-memory (ROM), a random access memory (RAM), an optical or magnetic media, or any other suitable physical media. In some embodiments, non-transitory computer program product 600 may be installed in, coupled to, and/or otherwise configured to be in communication with a computer device having a suitable light source. For example, non-transitory computer program product 600 may be memory 108 of mobile device 102 and/or programming instructions 609 may be identical to programming instructions 109. Programming instructions 609 may include a daylight sensor application and may be configured to be executed on a processor, such as, e.g., processor 107 of mobile device 102, or a similar computer processing device, such as, e.g., a microprocessor, a CPU (central processing unit), a microcontroller, a digital signal processor, etc. In some embodiments, programming instructions 609 may be embodied as firmware. Programming instructions 609 may, in some embodiments, be downloaded (either wirelessly or via wired connection) or otherwise copied from non-transitory computer program product 600 to a computer device having a suitable light source, such as, e.g., mobile device 102.

Figures 7, 8:
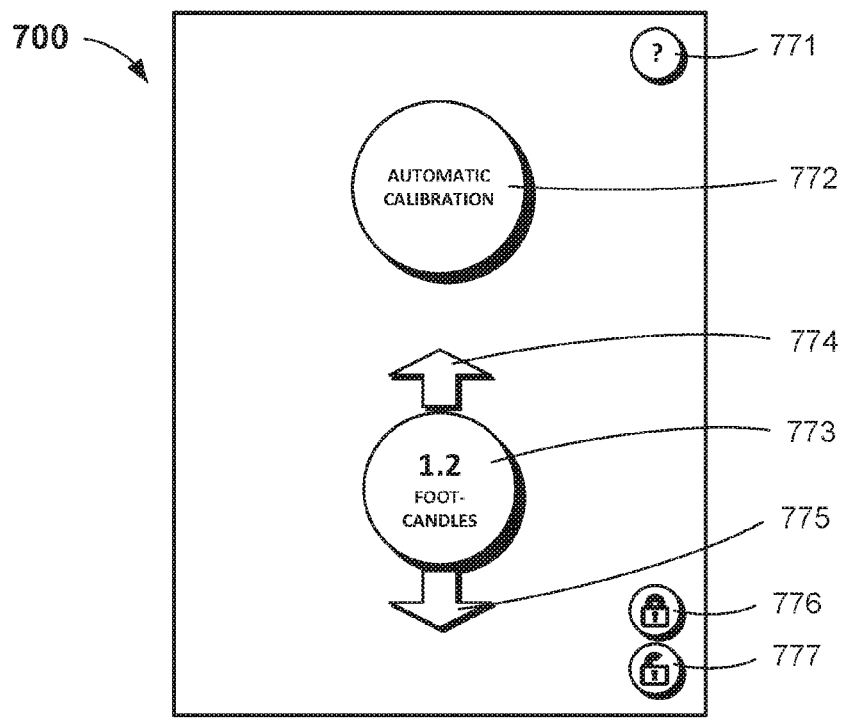
FIG. 7 illustrates a main application screen according to embodiments.
FIG. 8 illustrates a foot-candle selection table according to embodiments.

FIG. 7 illustrates a main application screen 700 in accordance with one or more embodiments that may be displayed on a user interface display of a mobile device in response to a processor of the mobile device executing programming instructions 609. Alternatively, main application screen 700 may be displayed on any suitable display of a computer device having a suitable processor for executing programming instructions 609. In some embodiments, main application screen 700 may open on a display upon activation of, e.g., an icon of a daylight sensor application on a main screen of a mobile device. Main application screen 700 may include a Help button 771, an Automatic Calibration button 772, a Foot-Candle button 773, a Foot-Candle Up arrow button 774, a Foot-Candle Down arrow button 775, Lock button 776, and an Unlock button 777. A foot-candle is a unit of measure of the intensity of light falling on a surface equal to 1 lumen per square foot.

A user press on Help button 771 may open a help screen, which may include a list of selectable topics and/or a search field to allow a user to search for desired information. Exiting the help screen may open main application screen 700.

A user press on Automatic Calibration button 772 may initiate an Automatic Calibration start sequence for a daylight sensor. In response to the user press, Automatic Calibration button 772 may blink for the duration of the Automatic Calibration start sequence, and a sound may be emitted when Automatic Calibration button 772 is pressed. All inputs to the mobile device (or other computer device executing programming instructions 609) may be ignored during the Automatic Calibration start sequence with the exception of an exit command.

A user press on Foot-Candle up arrow button 774 may increment a foot-candle display on Foot-Candle button 773 by one selection in, e.g., a table 800 of FIG. 8. A user press on Foot-Candle down arrow button 775 may decrement the foot-candle display on Foot-Candle button 773 by one selection in, e.g., table 800. A user press and hold on either arrow button 774 or 775 may move through the selections in, e.g., table 800 at an accelerated speed. A user press on Foot-Candle button 773 may initiate a "Send Set Point" sequence via visible light control signals transmitted from a light source as described further below. Foot-Candle button 773 may blink for the duration of the Send Set Point sequence, and a sound may be emitted when Foot-Candle button 773 is pressed. All inputs to the mobile device (or other computer device executing programming instructions 609) may be ignored during the Send Set Point sequence with the exception of an exit command.

A user press on Lock button 776 may present the user with a dialog to enter a 3-digit passcode to "lock" the daylight sensor (i.e., prevent changes to any of its settings). The dialog may have a button labeled "Cancel." When the "Cancel" button is pressed, the dialog may close. The dialog may also have a button labeled "Lock device." When the "Lock device" button is pressed, a "Lock device" sequence may be initiated. The dialog may close and Lock button 776 may blink for the duration of the Lock device sequence, and a sound may be emitted when the Lock button 776 is pressed. All inputs to the mobile device (or other computer device executing programming instructions 609) may be ignored during the Lock device sequence with the exception of an exit command. After being locked, the daylight sensor may need to be unlocked in order to change any of its settings.

A user press on Unlock button 777 may present the user with a dialog to enter a 3-digit passcode to "unlock" the daylight sensor (i.e., to enable the daylight sensor to respond/accept settings changes). The dialog may have a button labeled "Cancel." When the "Cancel" button is pressed the dialog may close. The dialog may also have a button labeled "Unlock device." When the "Unlock device" button is pressed, an "Unlock device" sequence may be initiated. The dialog may close and Unlock button 777 may blink for the duration of the Unlock device sequence, and a sound may be emitted when Unlock button 777 is pressed. All inputs to the mobile device (or other computer device executing programming instructions 609) may be ignored during the Unlock device sequence with the exception of an exit command.

A user press on the mobile device's back button in Main Application Screen 700 may exit the application, and a user press on the mobile device's back button in the Help Screen may open Main Application Screen 700.

Figures 9, 10:
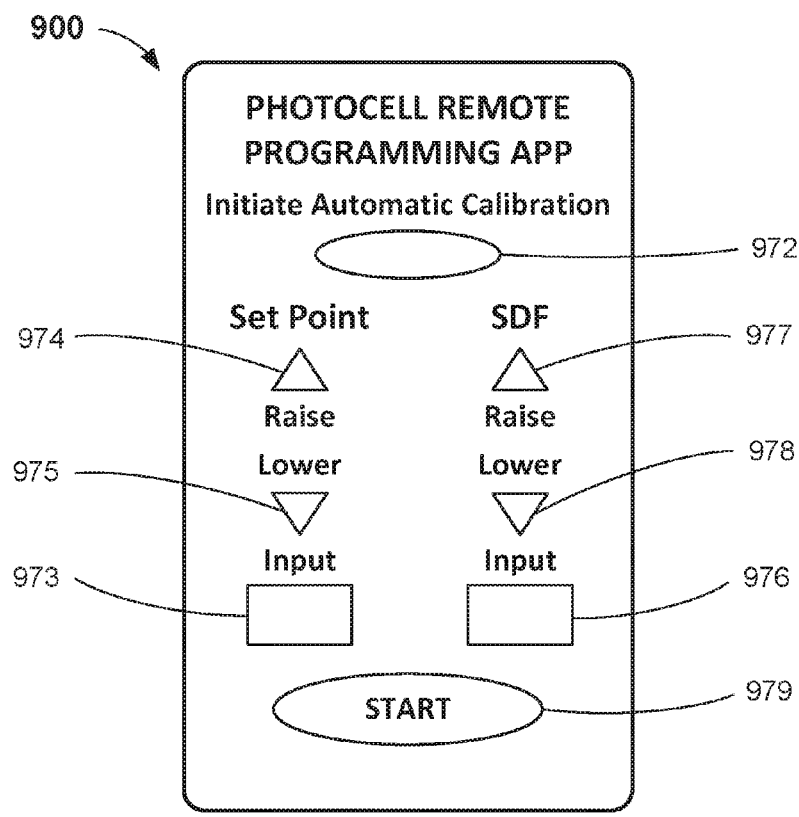
FIG. 9 illustrates another main application screen according to embodiments.
FIG. 10 illustrates a packet format for transmitting visible light control signals according to embodiments.

FIG. 9 illustrates a main application screen 900 in accordance with one or more embodiments that may be displayed on a user interface display of a mobile device in response to a processor of the mobile device executing programming instructions 609. Alternatively, main application screen 900 may be displayed on any suitable display of a computer device having a suitable processor executing programming instructions 609. In some embodiments, main application screen 900 may function substantially similarly as main application screen 700. Main application screen 900 may include an Initiate Automatic Calibration button 972, a Set Point Input field 973, a Set Point Up arrow button 974, a Set Point Down arrow button 975, an SDF (sunlight discount factor) Input field 976, an SDF Up arrow button 977, an SDF Down arrow button 978, and a Start button 979. Set Point Input field 973 may have a list of scrollable set-point values (not shown) that a user can select via Up and Down arrow buttons 974 and 975. An SDF may account for a difference in measurements between an amount of artificial light sensed reflecting off of a work surface versus an amount of sensed daylight. SDF (sunlight discount factor) Input field 976 may have a list of scrollable SDF values (not shown) that a user can select via Up and Down arrow buttons 977 and 978. Start button 979 may initiate transmission of one or more settings and/or adjustments of one or more parameters of a daylight sensor. In some embodiments, Initiate Automatic Calibration button 972, Set Point Input field 973, Set Point Up arrow button 974, and Set Point Down arrow button 975 may operate substantially similarly as Automatic Calibration button 772, Foot-Candle button 773, Foot-Candle Up arrow button 774, and Foot-Candle Down arrow button 775, respectively.

When executing on a processor or like computer processing device, programming instructions 609 may cause a mobile device with a suitable light source to transmit visible light control signals (i.e., commands) to a target daylight sensor by modulating the light output of the light source (e.g., the built-in flash for a mobile device's camera). In some embodiments, the light source should be configured to output full brightness during all communications.

The light output of the light source may be modulated with Pulsed Width Modulation (PWM). This modulation technique may use return-to-zero (RZ) bits to ensure a transition of state after each bit. The '0' and '1' bits may be transmitted over $t_b$ and $3 \times t_b$ of high intensity, respectively, followed by $t_b$ of zero intensity. A specified target value for $t_b$ may be 50 ms with a tolerance of ±20%. In some embodiments, absolute minimum time for a low bit (1 bit time) may be 25 ms, absolute maximum time for a low bit (1 bit time) may be <75 ms, absolute minimum time for a high bit (3 bit times) may be 75 ms, and/or absolute maximum time for a high bit (3 bit times) may be <225 ms.

FIG. 10 illustrates a packet format 1000 for transmitting visible light control signals to a daylight sensor in accordance with one or more embodiments. In some embodiments, packet format 1000 may include a start indication, at least 2 bytes of payload, and error checking. In some embodiments, transmission time may be under 5 seconds and/or packet format 1000 may be a total of, e.g., four bytes. The Most Significant Byte (MSB) may be sent first, and within the byte the Least Significant Bit (LSB) may be sent first. The first byte may be the header and may be defined as 0xA5. The 2nd and 3rd bytes of packet format 1000 may be reserved for data. And the fourth byte may be for error checking and may be defined as the XOR of the 3 preceding bytes. In some embodiments, a maximum length for a valid packet: 0xA5 0xFF 0xFF 0xA5=4.8 seconds, and/or a minimum length for a valid packet: 0xA5 0x00 0x00 0xA5=2.4 seconds.

FIG. 11 illustrates a table 1100 of command sequences in accordance with one or more embodiments. The command sequences include a "Cursty" command, an Automatic Calibration start, a Write set point, a Lock device, and an Unlock device. "Curtsy" may refer to lighting that dims down/turns off and then dims back up/turns on (or vice versa) in a short period of time (e.g., in about a second) to provide feedback to a user that, e.g., a transmitted signal has been received and/or accepted.

Figure 12:
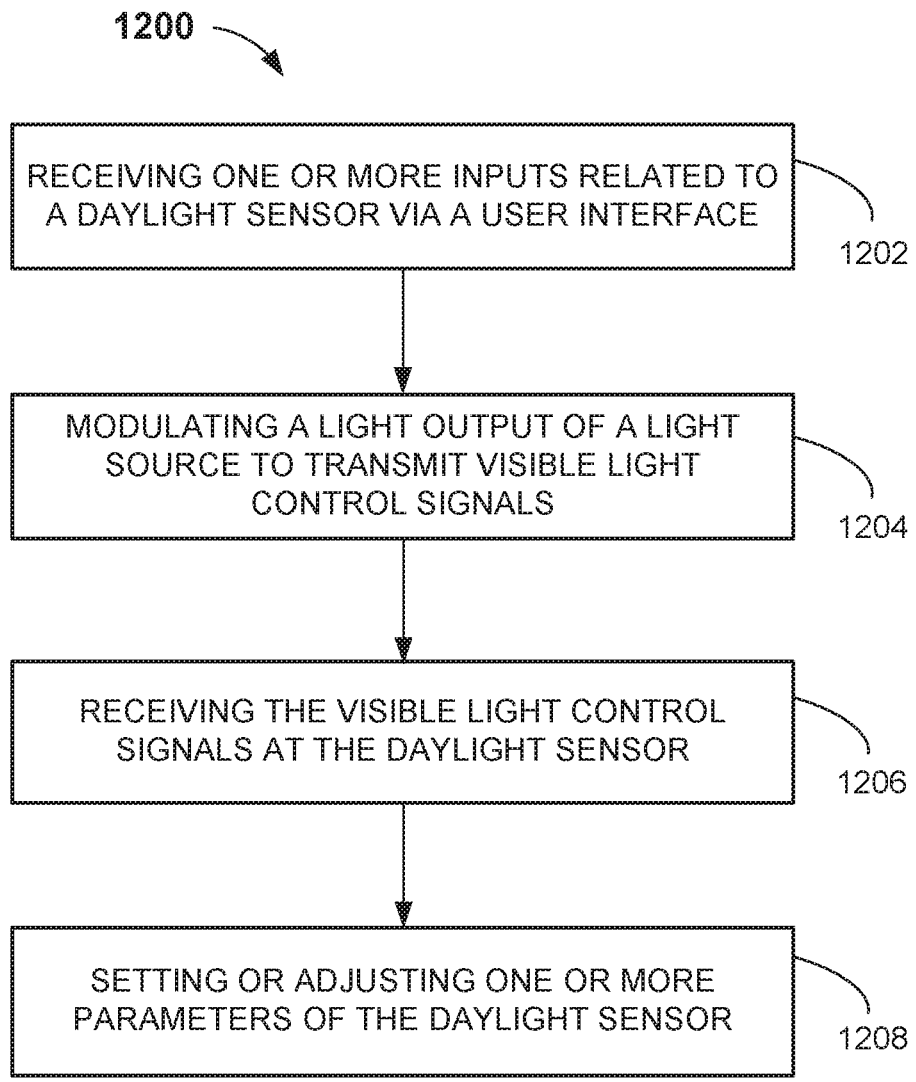
FIG. 12 illustrates a flowchart of a method of programming a daylight sensor according to embodiments.

FIG. 12 illustrates a method 1200 of programming a daylight sensor, such as, e.g., daylight sensors 104 and/or 204, in accordance with one or more embodiments. At process block 1202, method 1200 may include receiving one or more inputs related to a daylight sensor via a user interface. At process block 1204, method 1200 may include modulating a light output of a light source to transmit visible light control signals corresponding to the received user inputs. At process block 1206, method 1200 may include receiving the visible light control signals at the daylight sensor. And at process block 1208, method 1200 may include setting or adjusting one or more parameters of the daylight sensor in response to receiving the visible light control signals.

Figure 13:
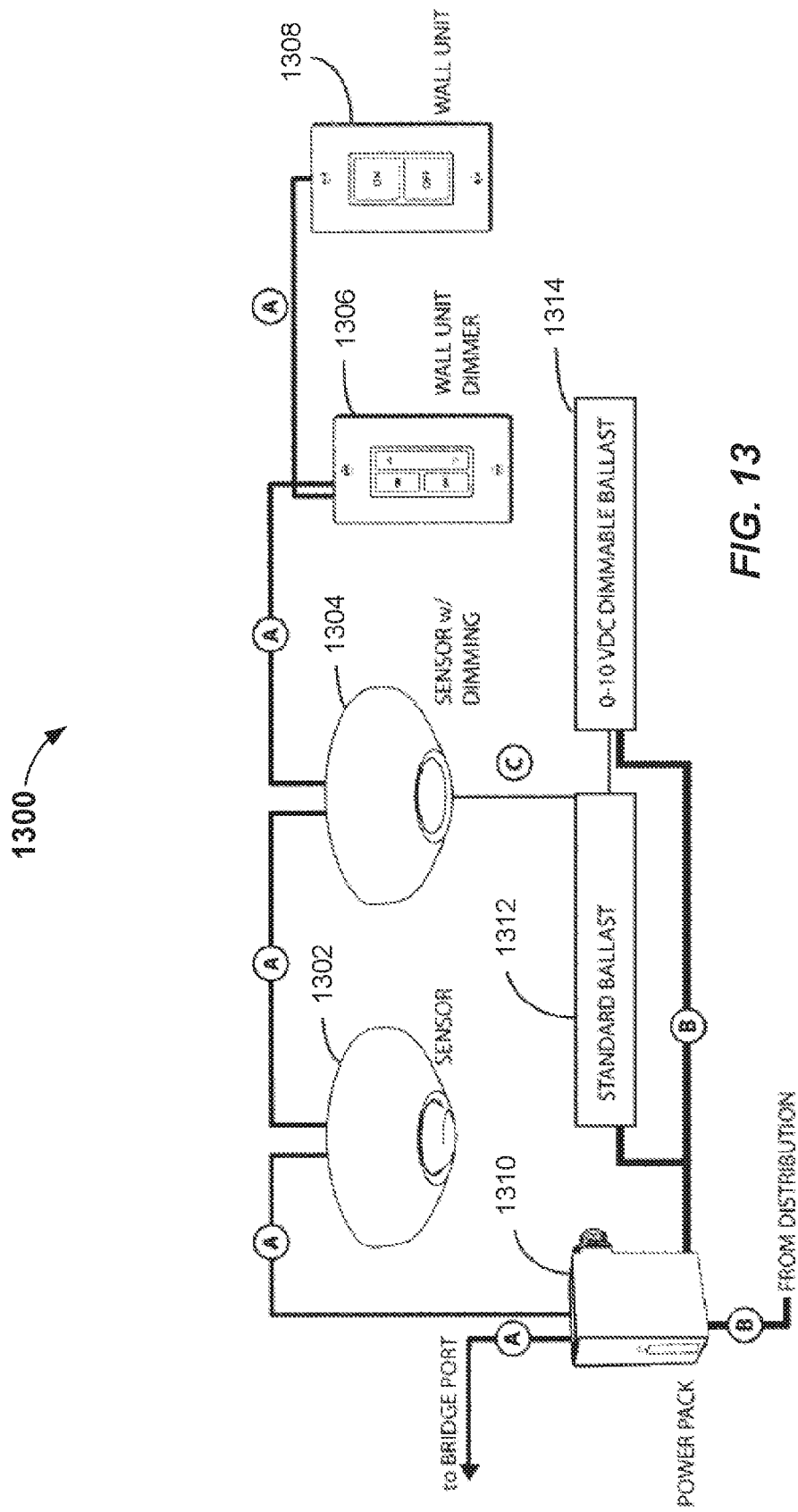
FIG. 13 illustrates a block diagram of a lighting control system that includes an occupancy sensor according to embodiments.

FIG. 13 illustrates a lighting control system 1300 in accordance with one or more embodiments. Lighting control system 1300 may include occupancy sensor 1302, daylight sensor 1304, manually-operated dimmer switch wall unit 1306, manually-operated toggle switch wall unit 1308, power pack 1310, load 1312, and load 1314. Load 1312 may be a light or other device with on/off functionality driven by a standard ballast, while load 1314 may be a dimmable lighting device driven by, e.g., a 0-10 VDC dimmable ballast. Note that other types of loads may be controlled by occupancy sensor 1302 and/or daylight sensor 1304.

Occupancy sensor 1302, daylight sensor 1304, and wall units 1306 and 1308 may receive power from and may be connected to power pack 1310 via CAT-5 cabling A. Power pack 1310 may also be connected to a bridge/communications router (not shown) via car-5 cabling A. Line voltage (e.g., 120/277/347 VAC) may be connected to power pack 1310 via Class 1 wiring B. Power pack 1310 may have an integrated relay controlled by the sensors and wall units to connect/disconnect line voltage to loads 1312 and 1314 also via Class 1 wiring B. Daylight sensor 1304 may communicate with loads 1312 and 1314 via low voltage Class 2 wiring C.

Occupancy sensor 1302 may have a hardware configuration substantially similar to hardware configuration 500 of FIG. 5, and may additionally include a sound sensor and/or a passive infrared sensor coupled to microcontroller 530 and may not include light receiving element 553. Occupancy sensor 1302 may have adjustable parameters, such as, e.g., a time delay after which lights turn off if occupancy is not detected. In some embodiments, occupancy sensor 1302 may be programmed to operate with either passive infrared (PIR) detection or both PIR and sound detection for rooms or areas with obstructions.

Daylight sensor 1304 may be identical to daylight sensors 104 and/or 204 and may receive visible light control signals as described above for setting and/or adjusting one or more parameters of occupancy sensor 1302. For example, the time delay after which lights turn off if occupancy is not detected may be changed from, e.g., a factory set 15 minutes to a user-desired 25 minutes via the visible light control signals received by daylights sensor 1304. Daylight sensor 1304 may communicate the received settings and adjustments to occupancy sensor 1302 via the wiring shown or, in other embodiments, may communicate the received settings and adjustments wirelessly to occupancy sensor 1302, provided both occupancy sensor 1302 and daylight sensor 1304 have suitable wireless transmitting and receiving components. Alternatively, the received settings and adjustments may be communicated from daylight sensor 1304 to occupancy sensor 1302 via a combination of wired and wireless connections.

Figure 14:
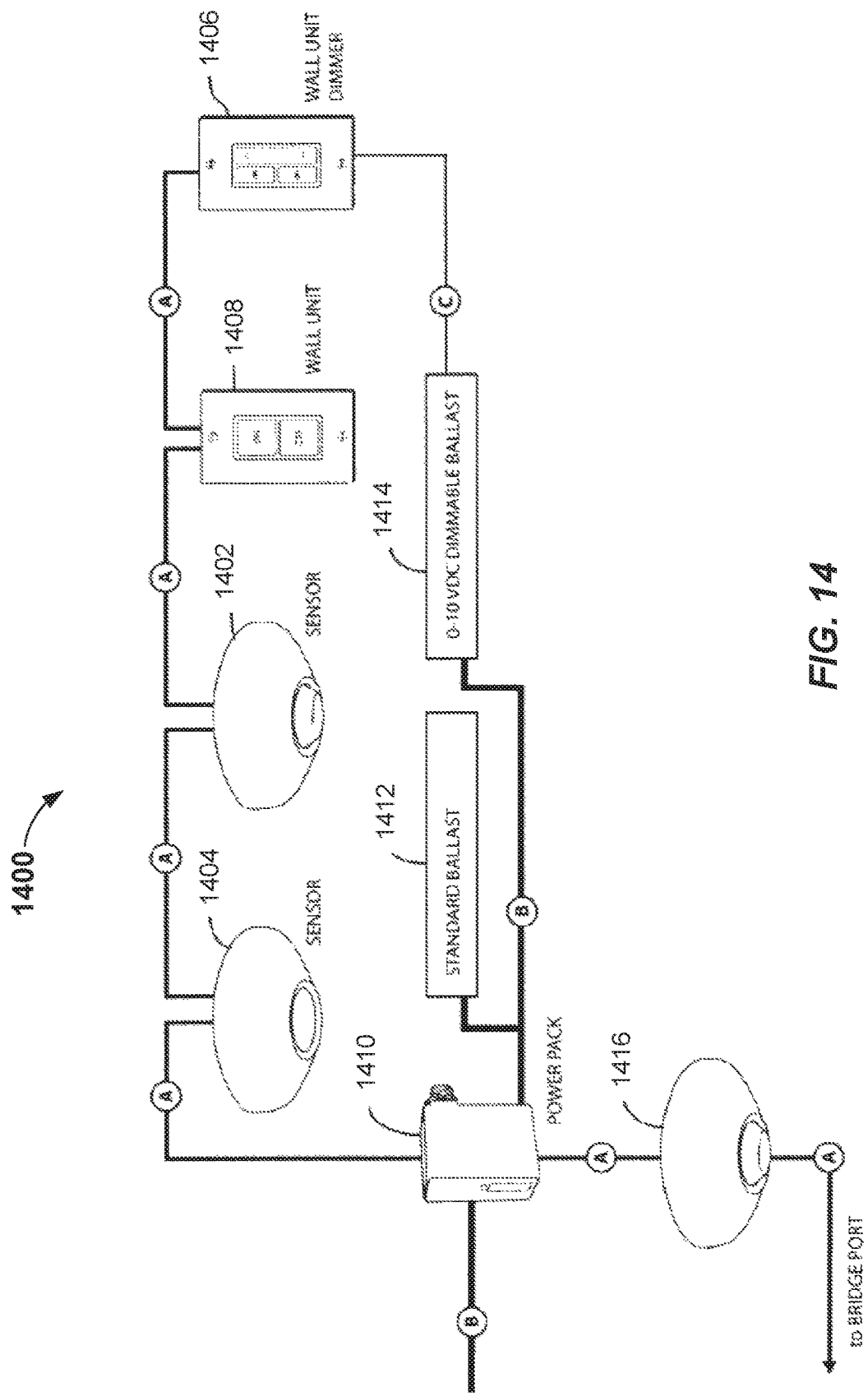
FIG. 14 illustrates a block diagram of a lighting control system that includes an optical sensor according to embodiments.

FIG. 14 illustrates a lighting control system 1400 in accordance with one or more embodiments. Lighting control system 1400 may include occupancy sensor 1402, daylight sensor 1404, manually-operated dimmer switch wall unit 1406, manually-operated toggle switch wall unit 1408, power pack 1410, loads 1412 and 1414, and optical sensor 1416. Occupancy sensor 1402, daylight sensor 1404, and wall units 1406 and 1408 may receive power from and be connected to power pack 1410 via CAT-5 cabling A. Power pack 1410 may also provide power and be connected to optical sensor 1416 via cAT-5 cabling A. Optical sensor 1416 may, in some embodiments, be connected to a bridge/communications router (not shown) via cAT-5 cabling A. Line voltage may be connected to power pack 1410 via Class 1 wiring B. The relay output of power pack 1410 may be connected to loads 1412 and 1414 via line voltage Class 1 wiring B. Load 1414, which may be a dimmable lighting device controlled by dimmable ballasts, may receive dimming control signals via low voltage Class 2 wiring connected to dimmer switch wall unit 1406. Dimming control signals may originate from either dimmer switch wall unit 1406 or daylight sensor 1404. Lighting control system 1400 may be programmed such that any one or both of sensors 1402 and 1404 and wall units 1406 and 1408 may control any one or both of loads 1412 and 1414.

Optical sensor 1416 may have a hardware configuration substantially similar to hardware configuration 500 of FIG. 5. Optical sensor 1416 may receive visible light control signals as described above for daylight sensors 104, 204, and 1304 for setting and/or adjusting one or more parameters of occupancy sensor 1402, daylight sensor 1404, and/or one or more other lighting control devices coupled to optical sensor 1416 via, e.g., a bridge/communications router (not shown) via the shown CAT-5 cabling A. Optical sensor 1416 may communicate the received settings and adjustments to one or more lighting control devices (such as, e.g., occupancy sensor 1402 and/or daylight sensor 1404) via the wiring shown or, in other embodiments, may communicate the received settings and adjustments wirelessly to one or more lighting control devices, provided those devices each have suitable wireless transmitting and receiving components. Alternatively, the received settings and adjustments may be communicated from optical sensor 1416 to one or more lighting control devices via a combination of wired and wireless connections.

Persons skilled in the art should readily appreciate that the invention described herein is susceptible of broad utility and application. Many embodiments and adaptations of the invention other than those described herein, as well as many variations, modifications, and equivalent arrangements, will be apparent from, or reasonably suggested by, the invention and the foregoing description thereof, without departing from the substance or scope of the invention. For example, although described in connection with programming daylight and/or occupancy sensors via visible light control signals transmitted from a mobile device, other types of lighting control devices may be programmed via visible light control signals transmitted from other types of devices having a light source and programming-instruction-processing capability. Accordingly, while the invention has been described herein in detail in relation to specific embodiments, it should be understood that this disclosure is only illustrative and presents examples of the invention and is made merely for purposes of providing a full and enabling disclosure of the invention. This disclosure is not intended to limit the invention to the particular apparatus, devices, assemblies, systems, or methods disclosed, but, to the contrary, the intention is to cover all modifications, equivalents, and alternatives falling within the scope of the invention.

What is claimed is:

1. A non-transitory computer program product comprising:
    programming instructions configured to be executed by a processor, the programming instructions when executed by the processor configured to cause the processor to:
        provide a user interface related to an optical sensor;
        receive via the user interface one or more user inputs related to the optical sensor or to a lighting control device coupled to the optical sensor; and
        modulate a light output of a light source to transmit visible light control signals wherein for each bit of data transmitted, a value of zero has a first duration time and a value of one has a second duration time, the first time duration not equal to the second duration time, a return-to-zero bit following each bit of data transmitted, the return-to-zero bit having a duration time equal to the first duration time, the visible light control signals corresponding to the one or more received user inputs, the visible light control signals configured to set or adjust one or more parameters of the optical sensor or the lighting control device.

2. The non-transitory computer program product of claim 1, wherein the programming instructions are configured to be executed by a processor of a mobile device comprising the user interface and the light source.

3. The non-transitory computer program product of claim 1, wherein the optical sensor is part of an occupancy sensor or a daylight sensor and the lighting control device comprises an occupancy sensor, a daylight sensor, or both.

4. The non-transitory computer program product of claim 1, wherein the one or more parameters comprises at least one of a lighting level set point or a sunlight discount factor.

5. A mobile device, comprising:
    a processor;
    a memory coupled to the processor and comprising programming instructions executable by the processor;
    a user interface coupled to the processor; and
    a light source coupled to the processor and having a light output controllable by the processor; wherein:
    the processor is configured via the programming instructions to:
        receive via the user interface one or more user inputs related to a lighting control device; and
        modulate the light output of the light source to transmit visible light control signals wherein for each bit of data transmitted, a value of zero has a first duration time and a value of one has a second duration time, the first duration time not equal to the second duration time, a return-to-zero bit following each bit of data transmitted, the return-to-zero bit having a duration time equal to the first duration time, the visible light control signals corresponding to the received one or more user inputs, the visible light control signals configured to set or adjust one or more parameters of the lighting control device.

6. The mobile device of claim 5, wherein the mobile device comprises a smartphone.

7. The mobile device of claim 5, wherein the lighting control device comprises an occupancy sensor, a daylight sensor, or both.

8. The mobile device of claim 5, wherein the one or more parameters comprises at least one of a lighting level set point or a sunlight discount factor.

9. A daylight sensor, comprising:
a light receiving device configured to receive ambient light and visible light control signals and to convert the received ambient light and visible light control signals to electrical signals;
a microcontroller coupled to receive the electrical signals from the light receiving device; and
a memory coupled to or embedded in the microcontroller and comprising programming instructions executable by the microcontroller; wherein:
the microcontroller is configured via the programming instructions to:
distinguish the electrical signals converted from the received ambient light from the electrical signals converted from the received visible light control signals wherein for each bit of data transmitted, a value of zero has a first duration time and a value of one has a second duration time, the first duration time not equal to the second duration time, a return-to-zero bit following each bit of data transmitted, the return-to-zero bit having a duration time equal to the first duration time;
adjust a lighting level of lighting coupled to the daylight sensor in response to receiving the electrical signals converted from the received ambient light; and
set or adjust one or more parameters of the daylight sensor in response to receiving the electrical signals converted from the received visible light control signals.

10. The daylight sensor of claim 9, wherein the one or more parameters comprises at least one of a lighting level set point or a sunlight discount factor.

11. A method of programming a daylight sensor, comprising:
receiving one or more inputs related to a daylight sensor via a user interface;
modulating a light output of a light source to transmit visible light control signals wherein for each bit of data transmitted, a value of zero has a first duration time and a value of one has a second duration time, the first duration time not equal to the second duration time, a return-to-zero bit following each bit of data transmitted, the return-to-zero bit having a duration time equal to the first duration time, the visible light control signals corresponding to the received user inputs;
receiving the visible light control signals at the daylight sensor; and
setting or adjusting one or more parameters of the daylight sensor in response to receiving the visible light control signals.

12. The method of claim 11, wherein a mobile device comprises the user interface and the light source and performs the receiving of one or more inputs and the modulating.

13. A lighting control system, comprising:
a daylight sensor; and
a non-transitory computer program product comprising programming instructions configured to be executed on a processor of a mobile device, the programming instructions when executed on the processor configured to cause the mobile device to:
provide a user interface related to settings or adjustments of one or more parameters of the daylight sensor;
receive via the user interface one or more user inputs related to the settings or adjustments; and
modulate a light output of a light source to transmit visible light control signals wherein for each bit of data transmitted, a value of zero has a first duration time and a value of one has a second duration time, the first duration time not equal to the second duration time, a return-to-zero bit following each bit of data transmitted, the return-to-zero bit having a duration time equal to the first duration time, the visible light control signals corresponding to the received one or more user inputs;
wherein the daylight sensor comprises:
a light receiving device configured to receive the visible light control signals and to convert the received visible light control signals to electrical signals; and
a microcontroller coupled to receive the electrical signals from the light receiving device and configured to set or adjust the one or more parameters of the daylight sensor in response to receiving the electrical signals.

14. The lighting control system of claim 13 further comprising a mobile device, the mobile device comprising the non-transitory computer program product, the processor, the user interface, and the light source.

15. A daylight sensor, comprising:
a light receiving device configured to receive ambient light and visible light control signals and to convert the received ambient light and visible light control signals to electrical signals, the visible light control signals corresponding to settings or adjustments of one or more parameters of a lighting control device coupled to the daylight sensor;
a microcontroller coupled to receive the electrical signals from the light receiving device; and
a memory coupled to or embedded in the microcontroller and comprising programming instructions executable by the microcontroller; wherein:
the microcontroller is configured via the programming instructions to:
distinguish the electrical signals converted from the received ambient light from the electrical signals converted from the received visible light control signals wherein for each bit of data transmitted, a value of zero has a first duration time and a value of one has a second duration time, the first duration time not equal to the second duration time, a return-to-zero bit following each bit of data transmitted, the return-to-zero bit having a duration time equal to the first duration time;
adjust a lighting level of lighting coupled to the daylight sensor in response to receiving the electrical signals converted from the received ambient light; and
transmit via a wired or wireless connection to the lighting control device the settings or adjustments in response to receiving the electrical signals converted from the received visible light control signals.

16. The daylight sensor of claim 15, wherein the lighting control device comprises an occupancy sensor.

17. The daylight sensor of claim 16, wherein the one or more parameters of the occupancy sensor include a time delay after which lights turn off if occupancy is not detected.

18. A lighting control system, comprising:
an optical sensor; and
a non-transitory computer program product comprising programming instructions configured to be executed on a processor of a mobile device, the programming instructions when executed on the processor configured to cause the mobile device to:
provide a user interface related to settings or adjustments of one or more parameters of a lighting control device coupled to the optical sensor;
receive via the user interface one or more user inputs related to the settings or adjustments; and
modulate a light output of a light source to transmit visible light control signals wherein for each bit of data transmitted, a value of zero has a first duration time and a value of one has a second duration time, the first duration time not equal to the second duration time, a return-to-zero bit following each bit of data transmitted, the return-to-zero bit having a duration time equal to the first duration time, the visible light control signals corresponding to the received one or more user inputs;
wherein the optical sensor comprises:
a light receiving device configured to receive the visible light control signals and to convert the received visible light control signals to electrical signals; and
a microcontroller coupled to receive the electrical signals from the light receiving device and configured to transmit via a wired or wireless connection to the lighting control device the settings or adjustments in response to receiving the electrical signals.

19. The lighting control system of claim 18 further comprising the lighting control device.

20. The lighting control system of claim 19, wherein the lighting control device comprises an occupancy sensor, a daylight sensor, or both.

* * * * *